T. G. HOGAN.
MAPLE FLAVORED SUGAR AND PROCESS OF MAKING SAME.
APPLICATION FILED MAR. 14, 1912.
1,037,766.
Patented Sept. 3, 1912.
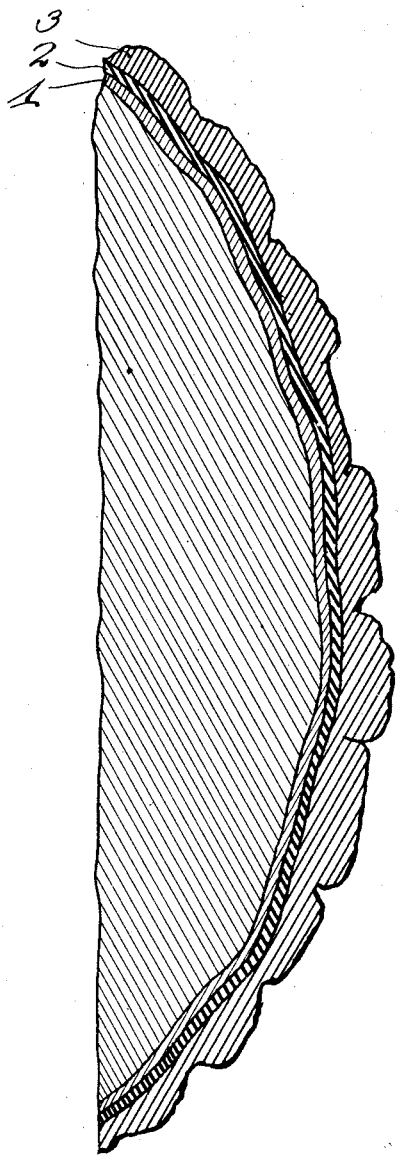
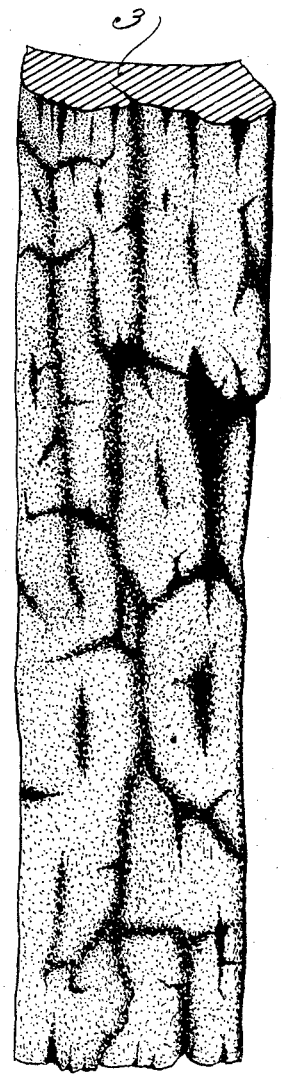
Witnesses
J. R. Pierce
L. M. McColl
Inventor
T. G. Hogan
by H. B. Willson & Co.
Attorneys

UNITED STATES PATENT OFFICE.

THOMAS G. HOGAN, OF HINTON, WEST VIRGINIA, ASSIGNOR OF ONE-HALF TO THOMAS E. CHARLTON AND ONE-HALF TO C. C. COALTER, BOTH OF HINTON, WEST VIRGINIA.

MAPLE-FLAVORED SUGAR AND PROCESS OF MAKING SAME.

1,037,766.  Specification of Letters Patent.  Patented Sept. 3, 1912.

Application filed March 14, 1912. Serial No. 683,776.

*To all whom it may concern:*

Be it known that I, THOMAS G. HOGAN, a citizen of the United States, residing at Hinton, in the county of Summers and State of West Virginia, have invented certain new and useful Improvements in Maple-Flavored Sugar and Process of Making Same; and I do declare the following to be a full, clear, and exact description of the invention, such as will enable others skilled in the art to which it appertains to make and use the same.

This invention relates to maple flavored sugar and syrup and to the process of making same.

The object of the invention is to produce a cheaply made maple flavored sugar and syrup so like that produced from the sap of the rock or sugar maple tree, technically known as "*Acer saccharum*", that it is practically impossible to detect the difference.

The product of the sap of the sugar maple tree is in either fluid or solid form, and is very agreeable to the taste of most persons, and commands a higher price in the market than some other saccharine products of equal grade because the natural supply of maple syrup and sugar from the sap of the sugar maple tree is limited in quantity and the continued extraction of the sap eventually kills the tree.

Maple sugar and syrup obtained from the sap of the sugar maple tree is expensive because of the scarcity of the trees owing to the fact that the continued drawing off of the sap causes the trees to die in a comparatively short time, and consequently, the supply is inadequate to the demand. This renders it necessary or desirable that products as near like those obtained from the sap of the tree be produced, and which may be produced and sold at less cost than the maple products obtained from the sap of the trees. It was in an effort to meet this demand that this invention was conceived.

This invention consists broadly in boiling a suitable quantity of the outside lifeless bark or cortex of rock or sugar maple trees, which is capable of imparting the desired flavor, in a suitable quantity of water and then adding commercial sugar to the liquid so obtained and boiling it until ready for use.

The maple family contains no less than fifty species, and yet experiment has proven that there is one only of these species, the outer lifeless bark of which, can be employed to produce an extract which, when combined with commercial sugar, has the flavor of the sap of the sugar or rock maple. It has also been discovered that the extract obtained from the outside lifeless bark of the sugar maple tree has the identical flavor of maple sugar or syrup obtained from the sap of the tree only when combined with commercial sugar, and not before said combination. It has further been ascertained that this bark can be utilized for obtaining the extract referred to only when obtained from the trunk or body of an aged tree of this variety, the age of which must be sufficient to cause the bark to crack or become shell-like. A tree under seventy-five years of age will not produce the bark which is necessary to obtain the extract desired sufficiently to be of commercial value.

In the accompanying drawings: Figure 1 represents a transverse section of a portion of the trunk of an aged sugar maple tree showing the inner live bark, the intermediate cellular layer and the outer corky lifeless bark. Fig. 2 is a perspective view of a piece of the outer lifeless bark from which the extract used in this invention is obtained.

It is well known that in trees of this character, a sample of which is shown in the accompanying drawing, the bark is separated into three layers: the inner bark or "bast" layer 1, technically termed "*liber endophlœum*"; an intermediate layer 2, which is more or less cellular, technically termed "*nesophlœum*"; and an outer layer, 3, which is more or less corky, and is known technically as "*epiphlœum*". The inner bark 1 and the intermediate layer 2 of this species contain objectionable coloring matter and other matter which is not safe to inject into the human stomach, hence the entire bark of young trees or saplings, twigs and smaller limbs or branches of the sugar maple cannot be employed to produce an extract for combination with commercial sugar for making maple flavored sugar and syrup. It is also well known that maple wood divested of its bark has been pulverized and used to produce an extract or flavoring for producing maple sugar and syrup, but this use of the wood is objectionable, as it destroys the trees, which it is the object of this invention to avoid. The extract obtained from the wood also contains a quantity of coloring matter which is undesirable, and which has a peculiar flavor which may be readily distinguished from the flavor of the sugar maple sap. I am also aware that the bark of other trees such as hickory, birch and the like have been used to obtain an extract which imparts a certain pleasing flavor but does not impart a maple flavor.

To make a syrup such as is commercially used for the table the following ingredients and proportions are preferably employed: One and one-half pounds of rough, outside lifeless bark of the rock or sugar maple is placed in one and one-half gallons of water and boiled until the liquid is reduced one-third, or to one gallon. The bark is then removed from the liquid and the latter strained to remove any detached particles. Then, to the one gallon of liquid so obtained eight pounds of commercial sugar is added, light brown sugar being preferably used. This mixture is then boiled for about thirty minutes, more or less, when the product is ready for use. When it is desired to make sugar, two and one-half pounds of the bark is immersed in one gallon of water and boiled as above described, using eight pounds of sugar to this amount of liquid, which, after boiling, is reduced to sugar by evaporation.

The above proportions given are those best adapted for my purposes, though it will be readily understood that these proportions may be varied and the same results obtained. For instance; two pounds of bark may be boiled for a shorter time and a decoction of about the same strength and flavor be obtained. When it is desired to facilitate the process, the bark is crushed or pulverized in a manner similar to that employed in tanning bark.

From the above description it may be readily seen that only the outside lifeless bark of the rock or sugar maple tree is employed for producing an extract which, when combined with commercial sugar, results in a maple flavored syrup or sugar, as may be desired, and this outside lifeless bark of the sugar maple tree from which the extract of this invention is obtained was heretofore thought to be useless, and its removal does not in any way injure or affect the life of the tree.

I claim as my invention:

1. A maple flavored saccharine article of commerce composed of sugar combined with an extract obtained from the outside lifeless bark of the rock or sugar maple.

2. A maple flavored saccharine article of commerce composed of commercial sugar combined with an extract obtained from the outside lifeless bark of the trunk of an aged rock or sugar maple tree.

3. A process of making a saccharine product having a maple sugar flavor which consists in boiling the outside lifeless bark taken from the trunk of the rock or sugar maple tree in water until an extract of the desired strength is obtained, then straining the liquid and adding commercial sugar thereto, and again boiling it until the desired strength is obtained.

4. A process of making a saccharine product having a maple flavor which consists in boiling approximately one and one-half pounds of the outside lifeless bark of the sugar maple tree in approximately one and one-half gallons of water, then separating the liquid from the bark, then adding approximately eight pounds of commercial sugar to the extract so obtained, and then boiling the sugar and extract until of the desired strength.

In testimony whereof I have hereunto set my hand in presence of two subscribing witnesses.

THOMAS G. HOGAN.

Witnesses:
JOHN HAYNES,
L. A. ANDERSON.

---

Copies of this patent may be obtained for five cents each, by addressing the "Commissioner of Patents, Washington, D. C."